United States Patent Office 3,231,595
Patented Jan. 25, 1966

---

3,231,595
ISOCYANATO SUBSTITUTED MULTICYCLO-
DECENES
Thomas K. Brotherton, South Charleston, and John W.
Lynn, Charleston, W. Va., assignors to Union Carbide
Corporation, a corporation of New York
No Drawing. Filed Mar. 27, 1963, Ser. No. 268,467
23 Claims. (Cl. 260—453)

This invention relates, in general, to a new class of unsaturated isocyanates. In one aspect, this invention relates to novel strained-ring unsaturated primary isocyanates of multicycloalkenes and to a process for their preparation.

The novel isocyanates of this invention contain more than two ring structures per molecule and can be conveniently represented by the following general formula:

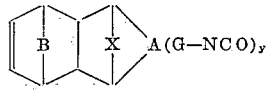

wherein B and X each represent a divalent radical which is a member selected from the group consisting of:

—$CH_2$—, —$CH_2$—$CH_2$—, —O—, and —CO— radicals; A represents a polyvalent radical which is a member selected from the group consisting of:

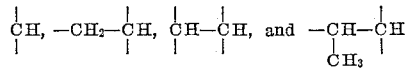

radicals, or A may consist of one or more saturated bridge radicals; G represents a divalent radical, preferably hydrocarbyl, containing from 1 to 10 carbon atoms and which is a member selected from the group consisting of alkylene, alkenylene, alkynylene, arylene, alkenearylene, arylenealkynylene, alkynylenearylene, cycloalkylene, cycloalkenylene, alkycloalkylene, alkylcycloalkenylene, cycloalkenylenealkylene, heterocyclylene, heterocyclylenearylene, heterocyclylenealkylene, alkyleneheterocyclylene, alkynyleneheterocyclylene, aryleneheterocyclylene, and heterocyclylenearylene radicals; and $y$ is a whole positive integer of from 1 to 2, inclusive. Any of the above radicals may be linked or contain various other common organic radicals or groups, e.g., ether, sulfide, polysulfide, sulfoxide, ester, nitro, nitrile, and carbonate radicals as well as metal groups.

Illustrative isocyanates encompassed by the present invention, with reference to the above general formula, include, among others,

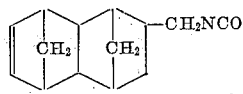

4-(isocyanatomethyl)tetracyclo[6.2.1.1.$^{3,6}$0.$^{2,7}$]dodec-
9-ene, wherein $y=1$,
$X$ and $B$=—$CH_2$—,
$A$=—$CH_2CH$—, and
     |
$G$=—$CH_2$—;

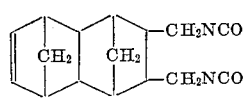

4,5-bis(isocyanatomethyl)tetracyclo[6.2.1.1.$^{3,6}$0.$^{2,7}$]
dodec-9-ene, wherein $y=2$,
$X$ and $B$=$CH_2$
$A$=—CH—CH—, and
     |    |

$G$=—$CH_2$—

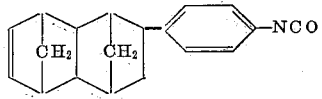

4-(p-isocyanatophenyl)tetracyclo[6.2.1.1.$^{3,6}$0.$^{2,7}$]dodec-
9-ene, wherein $y=1$,
$X$ and $B$=—$CH_2$—,
$A$=—$CH_2$—$CH$—
          |

$G$=—⟨⟩— and

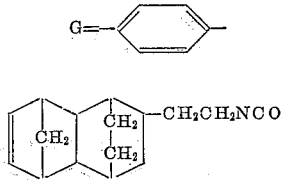

4-(isocyanatoethyl)tetracyclo[6.2.1.2$^{3,6}$0.$^{2,7}$]tridec-
9-ene, wherein $y=1$,
$B$=—$CH_2$—,
$X$=—$CH_2CH_2$—,
$A$=—$CH_2$—$CH$—
          |
$G$=—$CH_2CH_2$—, and

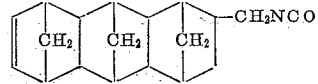

6-(isocyanatomethyl)hexacyclo[10.2.1.1$^{5,8}$0.$^{4,9}$.1$^{3,10}$0.$^{2,11}$]
heptadec-13-ene, wherein $y=1$,
$X$ and $B$=—$CH_2$—
$A$=

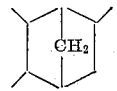

and $G$=—$CH_2$—

Isocyanates are very reactive materials which readily condense with active hydrogen-containing compounds such as alcohols, amines, carboxylic acids, amides, and water to form carbamates, ureas, and the like. Additionally, isocyanates can be homopolymerized to yield dimeric, trimeric and polymeric substances, or copolymerized to form valuable polymeric materials. Isocyanate-containing copolymers have been found particularly useful in the preparation of urethane foams, fibers, films, coatings, elastomers, and castings. For example, the polyisocyanates have been found useful in the preparation of flexible high molecular weight polymers by combining the polyisocyanate with flexible resins such as polyether glycols. Inasmuch as the novel compositions of one embodiment of this invention, wherein $y$ has a value of 2, are difunctional, in that each compound contains two isocyanate groups within the same molecule, they are particularly useful in those fields of application wherein polyisocyanates have been utilized. The isocyanates of this invention are all primary isocyanates. It has been found that primary isocyanates react more readily than secondary isocyanates with a common substrate and are thus much more desirable for use in the preparation of, e.g., polyurethane foams.

It is, therefore, an object of the present invention to provide novel unsaturated isocyanates which are suitable for use in the plastic and resin fields. Another object is to provide new compositions of matter comprising unsaturated strained-ring isocyanates containing more than two ring structures per molecule. A further object of the present invention is to provide new compositions of matter comprising the 4-(isocyanatoalkyl)-multicyclo-decenes, the 4-(isocyanatoaryl)multicyclo-decenes, the 6-(isocyanatoalkyl)multicyclo-decenes and the 6-(isocyanatoaryl) multicyclo-decenes, and related isocyanates. Another object of the present invention is to provide novel 4-(isocyanatoalkyl)tetracyclo[6.2.1.1.$^{3,6}$0.$^{2,7}$]dodec-9-enes, 4-(isocyanatoaryl)tetracyclo[6.2.1.1.$^{3,6}$0.$^{2,7}$]dodec-9-enes, 6-(isocyanatoaryl)hexacyclo[10.2.1.1.$^{5,8}$0.$^{4,9}$1.$^{3,10}$0.$^{2,11}$]heptadec-13-enes. Another object of this invention is to provide novel compounds containing two isocyanate groups. A still further object of the present invention is to provide novel compositions having polyfunctional properties. Another object of the present invention is to provide a novel process for the preparation of the aforesaid compositions. These and other objects will readily become apparent to those skilled in the art in the light of the teachings herein set forth.

In its broad aspect, this invention is directed to novel unsaturated isocyanates of the aforementioned general formula and to a process for their preparation. The novel compounds of the instant invention can be either monofunctional or difunctional depending upon the number of isocyanate groups attached to the multicyclic ring portion of the molecule. Thus, when y of the above formula has a value of 2, the molecule will be a diisocyanate. In either case, each compound will be an unsaturated isocyanate. The multicyclo ring portion of the molecule is preferably tetracyclo or hexacyclo, with tetracyclo being most preferred.

In one embodiment of the present invention the novel unsaturated isocyanates are represented by the aforementioned formula wherein only one isocyanate group is present in the molecule. Preferred compounds within this embodiment include those wherein y of the above general formula has a value of 1 and A, B, X and G are as hereinbefore defined. Particularly preferred compounds within this embodiment are those represented by the class formula:

wherein G has the same value as hereinbefore defined. The following compounds illustrate the novel unsaturated isocyanates of this embodiment of the present invention:

4-(isocyanatomethyl)tetracyclo[6.2.1.1.$^{3,6}$0.$^{2,7}$]dodec-9-ene,
4-(isocyanatoethyl)tetracyclo[6.2.1.1.$^{3,6}$0.$^{2,7}$]dodec-9-ene,
4-(4-isocyanatobutyl)tetracyclo[6.2.1.1.$^{3,6}$0.$^{2,7}$]dodec-9-ene,
4-(9-isocyanatononyl)tetracyclo[6.2.1.1.$^{3,6}$0.$^{2,7}$]dodec-9-ene,
4-(9-isocyanato-6-nonenyl)tetracyclo[6.2.1.1.$^{3,6}$0.$^{2,7}$]dodec-9-ene,
4-(p-isocyanatophenylmethyl)tetracyclo[6.2.1.1.$^{3,6}$0.$^{2,7}$]dodec-9-ene,
4-(o-isocyanatomethylphenyl)tetracyclo[6.2.1.1.$^{3,6}$0.$^{2,7}$]dodec-9-ene,
4-(4-isocyanatonaphthyl)tetracyclo[6.2.1.1.$^{3,6}$0.$^{2,7}$]dodec-9-ene,
4-(3-isocyanato-p-tolyl)tetracyclo[6.2.1.1.$^{3,6}$0.$^{2,7}$]dodec-9-ene,
4[4(p-isocyanatophenyl)-2-butenyl]tetracyclo[6.2.1.1.$^{3,6}$0.$^{2,7}$]dodec-9-ene,
4[4(p-isocyanato-2-butenyl]tetracyclo[6.2.1.1.$^{3,6}$0.$^{2,7}$]dodec-9-ene,
4-(5-isocyanatocyclohexyl)tetracyclo[6.2.1.1.$^{3,6}$0.$^{2,7}$]dodec-9-ene,
4-(2-isocyanato-3-cyclohexenyl)tetracyclo[6.2.1.1.$^{3,6}$0.$^{2,7}$]dodec-9-ene,
4-(3-isocyanatocyclohexylmethyl)tetracyclo[6.2.1.1.$^{3,6}$0.$^{2,7}$]dodec-9-ene,
4-(2-isocyanatomethylcyclohexyl)tetracyclo[6.2.1.1.$^{3,6}$0.$^{2,7}$]dodec-9-ene,
4[3(2-isocyanatoethyl)cycloheptyl]tetracyclo[6.2.1.1.$^{3,6}$0.$^{2,7}$]dodec-9-ene,
4[2(4-isocyanatobutyl)cyclohex-3-enyl]tetracyclo[6.2.1.1.$^{3,6}$0.$^{2,7}$]dodec-9-ene,
4-(2-isocyanatoethylpiperidyl)tetracyclo[6.2.1.1.$^{3,6}$0.$^{2,7}$]dodec-9-ene,
4-(2-isocyanatofurfuryl)tetracyclo[6.2.1.1.$^{3,6}$0.$^{2,7}$]dodec-9-ene,
and the like.

In a second embodiment of the present invention the novel unsaturated isocyanates are represented by the aforesaid general formula wherein two isocyanate groups are present in the molecule. Preferred compounds within this embodiment include those wherein y of the above general formula has a value of 2 and A, B, X and G have the same values as hereinbefore defined. Particularly preferred compounds within this embodiment are those represented by the class formula:

wherein G is as hereinbefore defined and need not represent the same groups in the molecule. The following compounds illustrate the novel unsaturated diisocyanates if this embodiment of the present invention:

4,5-bis(isocyanatomethyl)tetracyclo[6.2.1.1.$^{3,6}$0.$^{2,7}$]dodec-9-ene,
4,5-bis(9-isocyanatononyl)tetracyclo[6.2.1.1.$^{3,6}$0.$^{2,7}$]dodec-9-ene,
4,5-bis(9-isocyanato-6-nonenyl)tetracyclo[6.2.1.1.$^{3,6}$0.$^{2,7}$]dodec-9-ene,
4,5-bis(p-isocyanatophenyl)tetracyclo[6.2.1.1.$^{3,6}$0.$^{2,7}$]dodec-9-ene,
4,5-bis(p-isocyanatophenylmethyl)tetracyclo[6.2.1.1.$^{3,6}$0.$^{2,7}$]dodec-9-ene,
4,5-bis(o-isocyanatomethylphenyl)tetracyclo[6.2.1.1.$^{3,6}$0.$^{2,7}$]dodec-9-ene,
4,5-bis(4-isocyanatonaphthyl)tetracyclo[6.2.1.1.$^{3,6}$0.$^{2,7}$]dodec-9-ene,
4,5-bis(3-isocyanato-p-tolyl)tetracyclo[6.2.1.1.$^{3,6}$0.$^{2,7}$]dodec-9-ene,
4,5-bis(3-isocyanatocyclohexyl)tetracyclo[6.2.1.1.$^{3,6}$0.$^{2,7}$]dodec-9-ene,
4,5-bis(2-isocyanatocyclohex-3-enyl)tetracyclo[6.2.1.1.$^{3,6}$0.$^{2,7}$]dodec-9-ene,
4,5-bis(3-isocyanatocyclohexylmethyl)tetracyclo[6.2.1.1.$^{3,6}$0.$^{2,7}$]dodec-9-ene,
4,5-bis(2-isocyanatocyclohexylmethyl)tetracyclo[6.2.1.1.$^{3,6}$0.$^{2,7}$]dodec-9-ene,
4,5-bis(2-isocyanatomethylcyclohexyl)tetracyclo[6.2.1.1.$^{3,6}$0.$^{2,7}$]dodec-9-ene,
4,5-bis[2(2-isocyanatoethyl)cycloheptyl]tetracyclo[6.2.1.1.$^{3,6}$0.$^{2,7}$]dodec-9-ene,
4,5-bis[2(4-isocyanatobutyl)cyclohex-3-enyl]tetracyclo[6.2.1.1.$^{3,6}$0.$^{2,7}$]dodec-9-ene,
4,5-bis(2-isocyanatoethylpiperidyl)tetracyclo[6.2.1.1.$^{3,6}$0.$^{2,7}$]dodec-9-ene,
4,5-bis(2-isocyanatofurfuryl)tetracyclo[6.2.1.1.$^{3,6}$0.$^{2,7}$]dodec-9-ene,
and the like.

Although the preferred unsaturated isocyanates of this invention contain no elements other than carbon, hydrogen, oxygen and nitrogen, the various component groups of the molecule can be substituted with various organic and inorganic radicals containing such groups as ether, sulfide, polysulfide, sulfone, sulfoxide, ester, nitro, nitrile, carbonate, and various metal groups.

In accordance with the process of the instant invention, the novel unsaturated isocyanates of the aforementioned embodiments can be produced in relatively high yields by "phosgenation" of the corresponding amines, that is, sparging a carbonyl dihalide through a slurry of the amine or amine hydrohalide starting material contained in an inert, normally liquid reaction medium at a temperature within the range of from about 25° to about 200° C., more preferably from about 75° C. to about 150° C., and thereafter recovering the isocyanate product.

In general, the liquid reaction medium employed in the conversion of the unsaturated amines to the corresponding novel isocyanates must be inert to the reactants and stable under the conditions employed. Moreover, it should be easily separable from the resulting isocyanate. Typical inert, liquid solvents which have been found suitable for utilization as media in the process of the present invention include, among others, aromatic hydrocarbons such as toluene, xylene, naphthalene, tetrahydronaphthalene, benzene, diphenyl, cymene, amylbenzene, cycloaliphatic hydrocarbons such as cyclohexane, dihydronaphthalene; the chlorinated aromatic hydrocarbons such as chlorobenzene, ortho-dichlorobenzene, 1,2,4-trichlorobenzene; the chlorinated aliphatic hydrocarbons such as carbon terachloride, tetrachloroethylene, trichloroethylene; the dialkyl ketones such as diisobutyl ketone, methylisobutyl ketone, methylhexyl ketone, diisopropyl ketone and other solvents such as nitrobenzene, tetramethylene sulfone, and the like.

Although reaction temperatures within the aforementioned range of from about 25° to about 200° C., and more preferably from about 75° to about 150° C. have been found desirable, temperatures above and below this range can also be employed. However, from economic consideration the optimum yield and rate of reaction are attained within the aforesaid ranges.

Pressure is in no wise critical and the instant process can be conducted at atmospheric, subatmospheric and superatmospheric pressures.

Although the process of the instant invention preferably is conducted with phosgene, in its broadest concept the process includes the utilization of any carbonyl dihalide such as carbonyl dibromide. However, for economic considerations phosgene is the preferred carbonyl dihalide. In the preparation of the novel isocyanates of this invention, phosgene can be used in either the gaseous or liquid form.

Inasmuch as the yield and rate of formation of the isocyanates are dependent upon several variable, for example, concentration of the amine, solubility of the amine and phosgene in the reaction medium, reaction temperature, pressure and rate of addition of the phosgene, no hard and fast rule can be devised regarding the optimum conditions to be employed.

In a preferred embodiment of the present process a toluene solution containing the amine was gradually added to a solution of phosgene in toluene over a period of approximately 30 minutes. Thereafter, phosgene is subsequently sparged through the reaction mixture for about 5 hours while the temperature is raised to about 100° C. After removal of the by-product hydrogen chloride and the solvent a crude isocyanate product is obtained which can be refined by known purification techniques such as distillation, recrystallization and the like.

In practice, it has been found that the mole ratio of phosgene to amine in the initial reaction medium preferably should be in excess of 3:1, although satisfactory results have been obtained at a lower ratio. When the phosgene subsequently is sparged into the reaction medium feed rates of up to about 10 moles of phosgene per mole of amine per hour are preferred.

The starting materials for the production of the novel isocyanates of the present invention as hereinabove indicated, are the corresponding unsaturated amines. These amines can be conveniently represented by the following general formula:

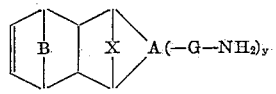

wherein A, B, X, G, and $y$ have the same value as hereinbefore defined. Thus, for the preparation of the novel isocyanates encompassed by the first embodiment of the present invention the amine starting materials can be represented by the class formula:

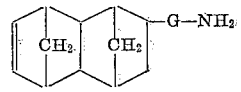

wherein G has the same value as hereinbefore defined. The following compounds illustrate the unsaturated amines used to prepare the first embodiment of the present invention:

4-(aminomethyl)tetracyclo[6.2.1.1.$^{3,6}$0.$^{2,7}$]dodec-9-ene,
4-(aminoethyl)tetracyclo[6.2.1.1.$^{3,6}$0.$^{2,7}$]dodec-9-ene,
4-(aminobutyl)tetracyclo[6.2.1.1.$^{3,6}$0.$^{2,7}$]dodec-9-ene,
4-(aminononyl)tetracyclo[6.2.1.1.$^{3,6}$0.$^{2,7}$]dodec-9-ene,
4-(amino-6-nonenyl)tetracyclo[6.2.1.1.$^{3,6}$0.$^{2,7}$]dodec-9-ene,
4-(aminophenylmethyl)tetracyclo[6.2.1.1.$^{3,6}$0.$^{2,7}$]dodec-9-ene,
4-(aminomethylphenyl)tetracyclo[6.2.1.1.$^{3,6}$0.$^{2,7}$]dodec-9-ene,
4-(aminonaphthyl)tetracyclo[6.2.1.1.$^{3,6}$0.$^{2,7}$]dodec-9-ene,
4-(amino-p-tolyl)tetracyclo[6.2.1.1.$^{3,6}$0.$^{2,7}$]dodec-9-ene,
4[6(4-amino-2-butenyl)]tetracyclo[6.2.1.1.$^{3,6}$0.$^{2,7}$]dodec-9-ene,
4-(3-aminocyclohexyl)tetracyclo[6.2.1.1.$^{3,6}$0.$^{2,7}$]dodec-9-ene,
4-(2-aminocyclohex-3-enyl)tetracyclo[6.2.1.1.$^{3,6}$0.$^{2,7}$]dodec-9-ene,
4-(3-aminocyclohexylmethyl)tetracyclo[6.2.1.1.$^{3,6}$0.$^{2,7}$]dodec-9-ene,
4-(2-aminomethylcyclohexyl)tetracyclo[6.2.1.1.$^{3,6}$0.$^{2,7}$]dodec-9-ene,
4[3(2-aminoethyl)cycloheptyl]tetracyclo[6.2.1.1.$^{3,6}$0.$^{2,7}$]dodec-9-ene,
4[2(4-aminobutyl)cyclohex-3-enyl]tetracyclo[6.2.1.1.$^{3,6}$0.$^{2,7}$]dodec-9-ene,
4-(2-aminoethylpiperidyl)tetracyclo[6.2.1.1.$^{3,6}$0.$^{2,7}$]dodec-9-ene,
4-(2-aminofurfuryl)tetracyclo[6.2.1.1.$^{3,6}$0.$^{2,7}$]dodec-9-ene,
and the like.

Similarly, the amine starting materials for the isocyanates of the aforesaid second embodiment can be represented by the class formula:

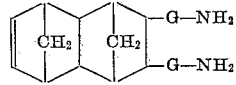

wherein G has the same value as hereinbefore defined. The following compounds illustrate the unsaturated amines used to prepare the second embodiment of the present invention:

4,5-bis(aminomethyl)tetracyclo[6.2.1.1.$^{3,6}$0.$^{2,7}$]dodec-9-ene,
4,5-bis(9-aminononyl)tetracyclo[6.2.1.1.$^{3,6}$0.$^{2,7}$]dodec-9-ene,
4,5-bis(9-amino-6-nonenyl)tetracyclo[6.2.1.1.$^{3,6}$0.$^{2,7}$]dodec-9-ene,
4,5-bis(o-aminophenyl)tetracyclo[6.2.1.1.$^{3,6}$0.$^{2,7}$]dodec-9-ene,
4,5-bis(p-aminophenylmethyl)tetracyclo[6.2.1.1.$^{3,6}$0.$^{2,7}$]dodec-9-ene, 4,5-bis(o-aminomethylphenyl)tetracyclo[6.2.1.1.$^{3,6}$0.$^{2,7}$]
dodec-9-ene,
4,5-bis(4-aminonaphthyl)tetracyclo[6.2.1.1.$^{3,6}$0.$^{2,7}$]
dodec-9-ene,
4,5-bis(3-amino-p-tolyl)tetracyclo[6.2.1.1.$^{3,6}$0.$^{2,7}$]
dodec-9-ene,
4,5-bis(5-aminocyclohexyl)tetracyclo[6.2.1.1.$^{3,6}$0.$^{2,7}$]
dodec-9-ene,
4,5-bis(2-aminocyclohex-3-enyl)tetracyclo
[6.2.1.1.$^{3,6}$0.$^{2,7}$]dodec-9-ene,
4,5-bis(3-aminocyclohexylmethyl)tetracyclo
[6.2.1.1.$^{3,6}$0.$^{2,7}$]dodec-9-ene,
4,5-bis(2-aminocyclohexylmethyl)tetracyclo
[6.2.1.1.$^{3,6}$0.$^{2,7}$]dodec-9-ene,
4,5-bis(2-aminomethylcyclohexyl)tetracyclo
[6.2.1.1.$^{3,6}$0.$^{2,7}$]dodec-9-ene,
4,5-bis[(2-aminoethyl)cycloheptyl]tetracyclo
[6.2.1.1.$^{3,6}$0.$^{2,7}$]dodec-9-ene,
4,5-bis[2(4-aminobutyl)cyclohex-3-enyl]tetracyclo
[6.2.1.1.$^{3,6}$0.$^{2,7}$]dodec-9-ene,
4,5-bis(2-aminoethylpiperidyl)tetracyclo
[6.2.1.1.$^{3,6}$0.$^{2,7}$]dodec-9-ene,
4,5-bis(2-aminofurfuryl)tetracyclo[6.2.1.1.$^{3,6}$0.$^{2,7}$]
dodec-9-ene,
and the like.

Each of the aforementioned classes of unsaturated amines can be derived by a Diels-Alder reaction employing a diene, such as cyclopentadiene, furan, cycloheptadiene, and an appropriate dienophile or unsaturated amine. Illustrative unsaturated amines which can be condensed with cyclopentadiene are as follows: allylamine, 1-amino-3-butene, 1-amino-5-hexenyl, 1-amino-10-undecenyl, 1-amino-3-pentene, 3-(p-aminophenyl) propene, p-aminomethyl styrene, 4-amino-2-methylphenyl styrene, 4-amino vinylcyclohexane, 1,4-diamino-2-butene, 1,10-diamino-5-decene, and the like.

Upon condensation with cyclopentadiene the following amine starting materials are obtained from the aforementioned unsaturated amines:

4-(aminomethyl)tetracyclo[6.2.1.1.$^{3,6}$0.$^{2,7}$]
dodec-9-ene,
4-(aminoethyl)tetracyclo[6.2.1.1.$^{3,6}$0.$^{2,7}$]
dodec-9-ene,
4-(aminobutyl)tetracyclo[6.2.1.1.$^{3,6}$0.$^{2,7}$]
dodec-9-ene,
4-(aminononyl)tetracyclo[6.2.1.1.$^{3,6}$0.$^{2,7}$]
dodec-9-ene,
4-(aminoethyl-5-methyl)tetracyclo[6.2.1.1.$^{3,6}$0.$^{2,7}$]
dodec-9-ene,
4-(p-aminophenylmethyl)tetracyclo[6.2.1.1.$^{3,6}$0.$^{2,7}$]
dodec-9-ene,
4-(amino-p-tolyl)tetracyclo[6.2.1.1.$^{3,6}$0.$^{2,7}$]
dodec-9-ene,
4-(3-aminocyclohexyl)tetracyclo[6.2.1.1.$^{3,6}$0.$^{2,7}$]
dodec-9-ene,
4,5-(diaminomethyl)tetracyclo[6.2.1.1.$^{3,6}$0.$^{2,7}$]
dodec-9-ene,
4,5-(diaminobutyl)tetracyclo[6.2.1.1.$^{3,6}$0.$^{2,7}$]
dodec-9-ene,
and the like.

The above condensation reaction involves two steps. In the first step, the unsaturated amine (dienophile) condenses with the diene cyclopentadiene to give the corresponding amino-substituted bicyclo[2.2.1]hept-5-ene derivative as an intermediate dienophile product. In the second step, this intermediate dienophile product reacts with the diene cyclopentadiene to give the unsaturated amine starting material. To illustrate, the unsaturated amine starting material 4-(aminomethyl)tetracyclo [6.2.1.1.$^{3,6}$0.$^{2,7}$]dodec-9-ene (I) can be prepared from cyclopentadiene (II) and allylamine (III) via bicyclo [2.2.1]hept-5-ene-3-methylamine (IV) as follows:

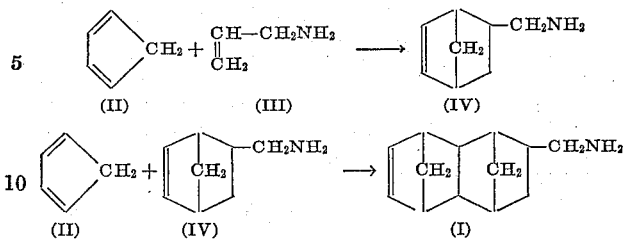

When subjected to the process of the instant invention the aforementioned unsaturated amine starting materials will give the following corresponding isocyanates:

4-(isocyanatomethyl)tetracyclo[6.2.1.1.$^{3,6}$0.$^{2,7}$]dodec-9-ene,
4-(isocyanatoethyl)tetracyclo[6.2.1.1.$^{3,6}$0.$^{2,7}$]dodec-9-ene,
4-(isocyanatobutyl)tetracyclo[6.2.1.1.$^{3,6}$0.$^{2,7}$]dodec-9-ene,
4-(isocyanatononyl)tetracyclo[6.2.1.1.$^{3,6}$0.$^{2,7}$]dodec-9-ene,
4-(isocyanatoethyl-5-methyl)tetracyclo[6.2.1.1.$^{3,6}$0.$^{2,7}$]
dodec-9-ene,
4-(p-isocyanatophenylmethyl)tetracyclo[6.2.1.1.$^{3,6}$0.$^{2,7}$]
dodec-9-ene,
4-(isocyanato-p-tolyl)tetracyclo[6.2.1.1.$^{3,6}$0.$^{2,7}$]dodec-9-ene,
4-(3-isocyanatocyclohexyl)tetracyclo[6.2.1.1.$^{3,6}$0.$^{2,7}$]
dodec-9-ene,
4,5-(diisocyanatomethyl)tetracyclo[6.2.1.1.$^{3,6}$0.$^{2,7}$]dodec-9-ene,
4,5-(diisocyanatobutyl)tetracyclo[6.2.1.1.$^{3,6}$0.$^{2,7}$]dodec-9-ene,
and the like.

Although the amine starting materials are prepared preferably from a diene and an unsaturated amine, other synthetic routes can also be used. For instance, cyclopentadiene can be condensed with an unsaturated halide by a Diels-Alder reaction followed by amminolysis with ammonia to give the corresponding amine. Similarly, cyclopentadiene can be condensed with an unsaturated nitro compound and subsequently reduced to the amine.

The following example is illustrative of the preparation of the unsaturated amine starting materials.

*Example 1.—4-(aminomethyl)tetracyclo[6.2.1.1.$^{3,6}$0.$^{2,7}$]
dodec-9-ene*

A mixture of 455 g. (7.98 moles) allylamine and 632 g. (4.79 moles) cyclopentadiene were placed in a stainless steel rocker bomb and reacted at 155 to 188° C. for approximately five hours under autogenous pressure. The crude mixture was distilled, and the material boiling from 55° C. at atmospheric pressure to 64° C. at 10 mm. of mercury absolute pressure was again charged to a rocker bomb as before and reacted at 180 to 210° C. for about nine hours.

The crude reaction mixture was fractionally distilled and the distillate fraction boiling from 33 to 101° C. at 0.1 mm. of mercury absolute pressure contained a mixture of the amine 4-(aminomethyl)tetracyclo[6.2.1.1.$^{3,6}$0.$^{2,7}$] dodec-9-ene, together with polycyclopentadienes. A portion of this distillate, which amounted to 243 grams (1.29 moles of contained amine), was added to 1.25 moles of concentrated hydrochloric acid at 0° C. The heterogeneous mixture was extracted twice with 250 ml. portions of benzene to remove the hydrocarbon contaminants; an aqueous layer contained the amine hydrochloride. This aqueous layer was treated with a 10 percent aqueous sodium hydroxide solution (containing 1.37 moles, a 10 percent excess, of sodium hydroxide), and the resultant mixture was washed with diethyl ether to extract the free amine 4-(aminomethyl)tetracyclo[6.2.1.1.$^{3,6}$0.$^{2,7}$]dodec-9-ene.

The ether extract was fractionally distilled, and the material boiling from 78° to 80° C. at 0.03 mm. of mercury absolute pressure showed a purity of 98.4 percent as the desired amine. 4-(aminomethyl)tetracyclo[6.2.1.1.$^{3,6}$0.$^{2,7}$]dodec-9-ene (by perchloric acid titration), a density of 1.0490 g./l. at 26° C., and a refractive index of 1.5328 at 30° C., D line. Infrared spectral data were consistent with the expected structure of the desired amine.

The following examples are illustrative of the preparation of the unsaturated isocyanates.

*Example II.—4-(isocyanatomethyl)tetracyclo[6.2.1.1.$^{3,6}$0.$^{2,7}$]dodec-9-ene*

A solution of 4-(aminomethyl)tetracyclo[6.2.1.1.$^{3,6}$0.$^{2,7}$]dodec-9-ene (63 g., 0.33 mole), prepared as in Example I, in 100 g. of xylene, was added to a xylene (318 g.) solution of phosgene (129 g., 1.3 mole) over a period of 5 minutes. The reaction mixture solution was maintained at 0° C. during the addition. Phosgene was subsequently sparged through the mixture for about 5 hours as the temperature of the mixture was gradually raised to 120° C. Dry nitrogen was then sparged through the mixture to remove by-product hydrogen chloride and excess phosgene. After removing the solvent from the mixture, 70 g. (98 percent yield) of crude 4-(isocyanatomethyl)tetracyclo-[6.2.1.1.$^{3,6}$0.$^{2,7}$]dodec-9-ene product was obtained. Refined product was obtained in 64 percent yield on subsequent distillation of the crude product. The material had a boiling point of 103°/0.5 mm., and $n$ 30/D 1.5252.

Analysis.—Calc'd for $C_{14}H_{17}NO$: C, 78.8; H, 7.9; N, 6.5. Found: C. 77.61; H, 7.92; N, 6.44.

Infrared spectrum was in agreement with that expected for 4-(isocyanatomethyl)tetracyclo[6.2.1.1.$^{3,6}$0.$^{2,7}$]dodec-9-ene with maxima at 3.18$\mu$ (bridgehead CH), 3.27$\mu$ (=CH), 4.4$\mu$ (—NCO), 6.38$\mu$ (bicycloheptene C=C), and 13.3$\mu$ (cis CH=CH).

*Example III.—4-(p-isocyanatophenyl)tetracyclo[6.2.1.1.$^{3,6}$0.$^{2,7}$]dodec-9-ene*

In a manner similar to that in Example II, 4-(p-isocyanatophenyl)-tetracyclo[6.2.1.1.$^{3,6}$0.$^{2,7}$]dodec-9-ene is obtained from 4-(p-aminophenyl)-tetracyclo[6.2.1.1.$^{3,6}$0.$^{2,7}$]dodec-9-ene and phosgene.

*Example IV.—4-(isocyanatoethyl)tetracyclo[6.2.1.1.$^{3,6}$0.$^{2,7}$]dodec-9-ene*

In a manner similar to that in Example II, 4-(isocyanatoethyl)-tetracyclo[6.2.1.1.$^{3,6}$0.$^{2,7}$]dodec-9-ene is obtained from 4-(aminoethyl)-tetracyclo[6.2.1.1.$^{3,6}$0.$^{2,7}$]dodec-9-ene and phosgene.

*Example V.—4,5-bis(isocyanatomethyl)tetracyclo[6.2.1.1.$^{3,6}$0.$^{2,7}$]dodec-9-ene*

In a manner similar to that in Example II, 4,5-bis(isocyanatomethyl)-tetracyclo[6.2.1.1.$^{3,6}$0.$^{2,7}$]dodec-9-ene is obtained from 4,5-bis(aminomethyl)-tetracyclo[6.2.1.1.$^{3,6}$0.$^{2,7}$]dodec-9-ene and phosgene.

*Example VI.—6-(isocyanatomethyl)hexacyclo[10.2.1.1.$^{5,8}$0.$^{4,9}$1.$^{3,10}$0.$^{2,11}$]heptadec-13-ene*

In a manner similar to that in Example II, 6-(isocyanatomethyl)-hexacyclo[10.2.1.1.$^{5,8}$0.$^{4,9}$1.$^{3,10}$0.$^{2,11}$]heptadec-13-ene is obtained from 6-(aminomethyl)hexacyclo[10.2.1.1.$^{5,8}$0.$^{4,9}$1.$^{3,10}$0.$^{2,11}$]heptadec-13-ene and phosgene.

The unsaturated isocyanates of the present invention, such as those prepared in Examples II to VI, may be reacted with, for example, hydroxy-epoxy compounds to give monomers which may be polymerized to still more useful end products. For example, 4-(isocyanatomethyl)tetracyclo-[6.2.1.1.$^{3,6}$0.$^{2,7}$]dodec-9-ene will react with glycidol to give the corresponding glycidyl carbamate as follows:

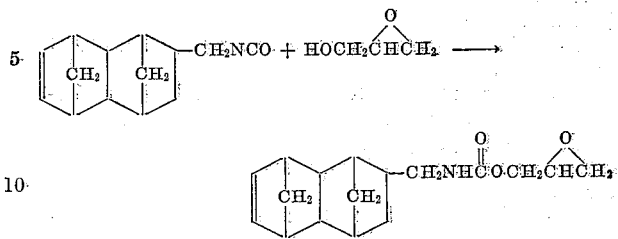

This glycidyl carbamate (epoxymonomer) may be polymerized via the epoxy group to still more useful polymers.

Although the invention has been illustrated by the preceding examples, it is not to be construed as limited to the materials employed therein, but rather, the invention encompasses the general area as hereinbefore disclosed. Various modifications and embodiments of this invention can be made without departing from the spirit and scope thereof.

What is claimed is:

1. Compound of the formula:

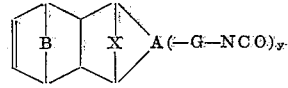

wherein B and X each represent a divalent radical which is a member selected from the group consisting of:

—CH$_2$—, —CH$_2$—CH$_2$—, —O—, and —CO— radicals; A represents a polyvalent radical which is a member selected from the group consisting of:

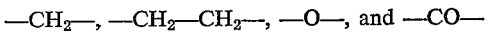

G represents a divalent hydrocarbyl radical containing only carbon and hydrogen with from 1 to 10 carbon atoms; and y is a whole positive integer of from 1 to 2, inclusive with the proviso that y is always 2 when A represents

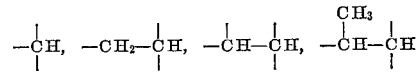

and

2. Compound of the formula:

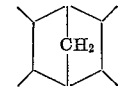

wherein G represents a divalent hydrocarbyl radical containing only carbon and hydrogen with from 1 to 10 carbon atoms.

3. Compound of the formula:

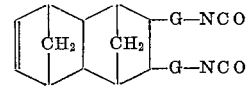

wherein G represents a divalent hydrocarbyl radical containing only carbon and hydrogen with from 1 to 10 carbon atoms.

4. 4-(isocyanatomethyl)tetracyclo[6.2.1.1.$^{3,6}$0.$^{2,7}$]dodec-9-ene.

5. 4-(p-isocyanatophenyl)tetracyclo[6.2.1.1.$^{3,6}$0.$^{2,7}$]dodec-9-ene.

6. 4-(isocyanatoethyl)tetracyclo[6.2.1.1$^{3,6}$0.$^{2,7}$]dodec-9-ene.

7. 6-(isocyanatomethyl)hexacyclo [10.2.1.1$^{5,8}$0.$^{4,9}$1.$^{3,10}$0.$^{2,11}$]-heptadec-13-ene.

8. 4,5 - bis(isocyanatomethyl)tetracyclo[6.2.1.1$^{3,6}$0.$^{2,7}$]dodec-9-ene.

9. 4 - (isocyanatoalkyl)tetracyclo[6.2.1.1$^{3,6}$.0$^{2,7}$]dodec-9-ene wherein the alkyl has from 1 to 10 carbon atoms.

10. 4,5 - bis(isocyanatoalkyl)tetracyclo[6.2.1.1$^{3,6}$.0$^{2,7}$]dodec-9-ene wherein each alkyl has from 1 to 10 carbon atoms.

11. 4 - (isocyanatoalkenyl)tetracyclo[6.2.1.1$^{3,6}$.0$^{2,7}$]dodec-9-ene wherein the alkenyl has from 3 to 10 carbon atoms.

12. 4,5-bis(isocyanatoalkenyl)tetracyclo[6.2.1.1$^{3,6}$.0$^{2,7}$]dodec-9-ene wherein each alkenyl has from 3 to 10 carbon atoms.

13. 4 - (isocyanatoaryl)tetracyclo[6.2.1.1$^{3,6}$.0$^{2,7}$]dodec-9-ene wherein the aryl has from 6 to 10 carbon atoms.

14. 4,5-bis(isocyanatoaryl)tetracyclo[6.2.1.1$^{3,6}$.0$^{2,7}$]dodec-9-ene wherein each aryl has from 6 to 10 carbon atoms.

15. 4 - isocyanatoalkaryl)tetracyclo[6.2.1.1$^{3,6}$.0$^{2,7}$]dodec-9-ene wherein the alkaryl has from 7 to 10 carbon atoms.

16. 4,5-bis(isocyanatoalkaryl)tetracyclo[6.2.1.1$^{3,6}$.0$^{2,7}$]dodec-9-ene wherein each alkaryl has from 7 to 10 carbon atoms.

17. 4 - (isocyanatocycloalkyl)tetracyclo[6.2.1.1$^{3,6}$.0$^{2,7}$]dodec-9-ene wherein the cycloalkyl has from 4 to 10 carbon atoms.

18. 4,5-bis(isocyanatocycloalkyl)tetracyclo [6.2.1.1$^{3,6}$.0$^{2,7}$]dodec-9-ene wherein each cycloalkyl has from 4 to 10 carbon atoms.

19. 4-(isocyanatoalkylcycloalkyl)tetracyclo [6.2.1.1$^{3,6}$.0$^{2,7}$]dodec-9-ene wherein the alkylcycloalkyl has from 5 to 10 carbon atoms.

20. 4,5-bis(isocyanatoalkylcycloalkyl)tetracyclo [6.2.1.1$^{3,6}$.0$^{2,7}$]dodec-9-ene wherein each alkylcycloalkyl has from 5 to 10 carbon atoms.

21. 4-(isocyanatocycloalkenyl)tetracyclo [6.2.1.1$^{3,6}$.0$^{2,7}$]dodec-9-ene wherein the cycloalkenyl has from 4 to 10 carbon atoms.

22. 4,5-bis(isocyanatoalkenyl)tetracyclo[6.2.1.1$^{3,6}$.0$^{2,7}$]dodec-9-ene wherein each cycloalkenyl has from 4 to 10 carbon atoms.

23. 6-(isocyanatoalkyl)hexacyclo [10.2.1.1$^{5,8}$.0$^{4,9}$.1$^{3,10}$.0$^{2,11}$]heptadec - 13 - ene wherein the alkyl has from 1 to 10 carbon atoms.

References Cited by the Examiner
UNITED STATES PATENTS

| | | | |
|---|---|---|---|
| 2,326,501 | 8/1943 | Siefken et al. | 260—453 |
| 2,340,757 | 2/1944 | Kaase et al. | 260—453 |

CHARLES B. PARKER, *Primary Examiner.*